(12) United States Patent
Kant et al.

(10) Patent No.: US 6,297,936 B1
(45) Date of Patent: Oct. 2, 2001

(54) INTEGRAL LOAD BEAM PUSH-PULL MICROACTUATOR

(75) Inventors: Rishi Kant, Boulder; Frederick Mark Stefansky, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/435,973

(22) Filed: Nov. 8, 1999

Related U.S. Application Data (60) Provisional application No. 60/107,696, filed on Nov. 9, 1998.

(51) Int. Cl.$^7$ ........................................................ G11B 5/56
(52) U.S. Cl. ........................................ 360/294.4; 360/294.6
(58) Field of Search ............................... 360/294.4, 294.6

(56) References Cited

U.S. PATENT DOCUMENTS

| | | | |
|---|---|---|---|
| 3,924,268 | 12/1975 | McIntosh et al. | 360/78 |
| 4,374,402 | 2/1983 | Blessom et al. | 360/104 |
| 4,651,242 | 3/1987 | Hirano et al. | 360/103 |
| 4,764,829 | 8/1988 | Makino | 360/106 |
| 4,914,725 | 4/1990 | Belser et al. | 318/560 |
| 5,021,906 | 6/1991 | Chang et al. | 360/103 |
| 5,034,828 | 7/1991 | Ananth et al. | 360/75 |
| 5,177,652 | 1/1993 | Yamaguchi et al. | 360/78.05 |
| 5,189,578 | 2/1993 | Mori et al. | 360/106 |
| 5,303,105 | 4/1994 | Jorgenson | 360/106 |
| 5,364,742 | 11/1994 | Fan et al. | 430/317 |
| 5,375,033 | 12/1994 | MacDonald | 361/281 |
| 5,521,778 | 5/1996 | Boutaghou | 360/106 |
| 5,657,188 | 8/1997 | Jurgenson et al. | 360/106 |
| 5,745,319 | 4/1998 | Takekado et al. | 360/78.05 |
| 5,764,444 | 6/1998 | Imamura et al. | 360/109 |
| 5,781,381 | 7/1998 | Koganezawa et al. | 360/106 |
| 5,796,558 | 8/1998 | Hanrahan et al. | 360/106 |
| 5,801,472 | 9/1998 | Wada et al. | 310/309 |
| 5,805,375 | 9/1998 | Fan et al. | 360/78.12 |
| 5,856,896 | 1/1999 | Berg et al. | 360/104 |
| 5,867,347 | 2/1999 | Knight et al. | 360/104 |
| 5,896,246 | 4/1999 | Budde et al. | 360/104 |
| 5,898,541 | 4/1999 | Boutaghou et al. | 360/109 |
| 5,898,544 | 4/1999 | Krinke et al. | 360/104 |
| 5,920,441 | 7/1999 | Cunningham et al. | 360/78.05 |

FOREIGN PATENT DOCUMENTS

| | | | |
|---|---|---|---|
| 0 412 221 B1 | 11/1989 | (EP) . | |
| 63-122069 | 5/1988 | (JP) . | |
| 02-263369 | 4/1989 | (JP) . | |
| 04-134681 | 5/1992 | (JP) . | |
| 04-368676 | 12/1992 | (JP) . | |
| 05-094682 | 4/1993 | (JP) | G11B/21/21 |
| 06-020412 | 1/1994 | (JP) . | |
| 07-085621 | 3/1995 | (JP) | G11B/21/20 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

Primary Examiner—Robert S. Tupper
(74) Attorney, Agent, or Firm—Kinney & Lange, P.A.

(57) ABSTRACT

A microactuator is employed in a disc drive system to finely position a transducing head adjacent to a selected track of a rotatable disc. The disc drive includes an actuator arm, a load beam attached to the actuator arm, and a flexure supporting a slider carrying the transducing head adjacent to a surface of the rotatable disc. The microactuator is formed integrally with the load beam, and is attached to the flexure so that displacement effected by the microactuator deflects a portion of the load beam to finely position the flexure and the head-carrying slider with respect to the selected track of the rotatable disc.

13 Claims, 6 Drawing Sheets

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

INTEGRAL LOAD BEAM PUSH-PULL MICROACTUATOR

CROSS-REFERENCE TO RELATED APPLICATION(S)

This application claims priority from Provisional Application No. 60/107,696 filed Nov. 9, 1998 for "Degenerated In-Plane, Push-Pull Microactuator" by R. Kant and F. M. Stefansky.

BACKGROUND OF THE INVENTION

The present invention relates to a disc drive microactuator, and more particularly to a high resolution head positioning mechanism that is integrated into a disc drive load beam.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional lower resolution actuator motor, thereby effecting head positioning through dual-stage actuation. Various microactuator designs have been considered to accomplish high resolution head positioning. One such design is disclosed in U.S. application Ser. No. 09/289,024 filed Apr. 9, 1999 for "Unitary Synchronous Flexure Microactuator" by R. Kant and F. M. Stefansky, and another similar design is disclosed in U.S. application Ser. No. 09/359,109 filed Jul. 22, 1999 for "Low-Stress Disc Drive Microactuator Cradle" by F. M. Stefansky and R. Kant, both of which are hereby incorporated by reference. These designs each include a microactuator cradle that carries the entire micro-electronic machine (MEM) that supports the slider and generates high resolution displacement of the slider. The microactuator cradle is mounted to a load beam connected to an actuator arm, which is coarsely positioned by a main actuator and supports the entire cradle and slider structure over the surface of a disc. There is a continuing need in the art for improved microactuator designs, to achieve desired characteristics for operation in a disc drive system.

BRIEF SUMMARY OF THE INVENTION

The present invention employs a microactuator in a disc drive system to finely position a transducing head adjacent to a selected track of a rotatable disc. The disc drive includes an actuator arm, a load beam attached to the actuator arm, and a flexure supporting a slider carrying the transducing head adjacent to a surface of the rotatable disc. The microactuator is formed integrally with the load beam, and is attached to the flexure so that displacement effected by the microactuator deflects a portion of the load beam to finely position the flexure and the head-carrying slider with respect to the selected track of the rotatable disc.

DETAILED DESCRIPTION

Figure 1:
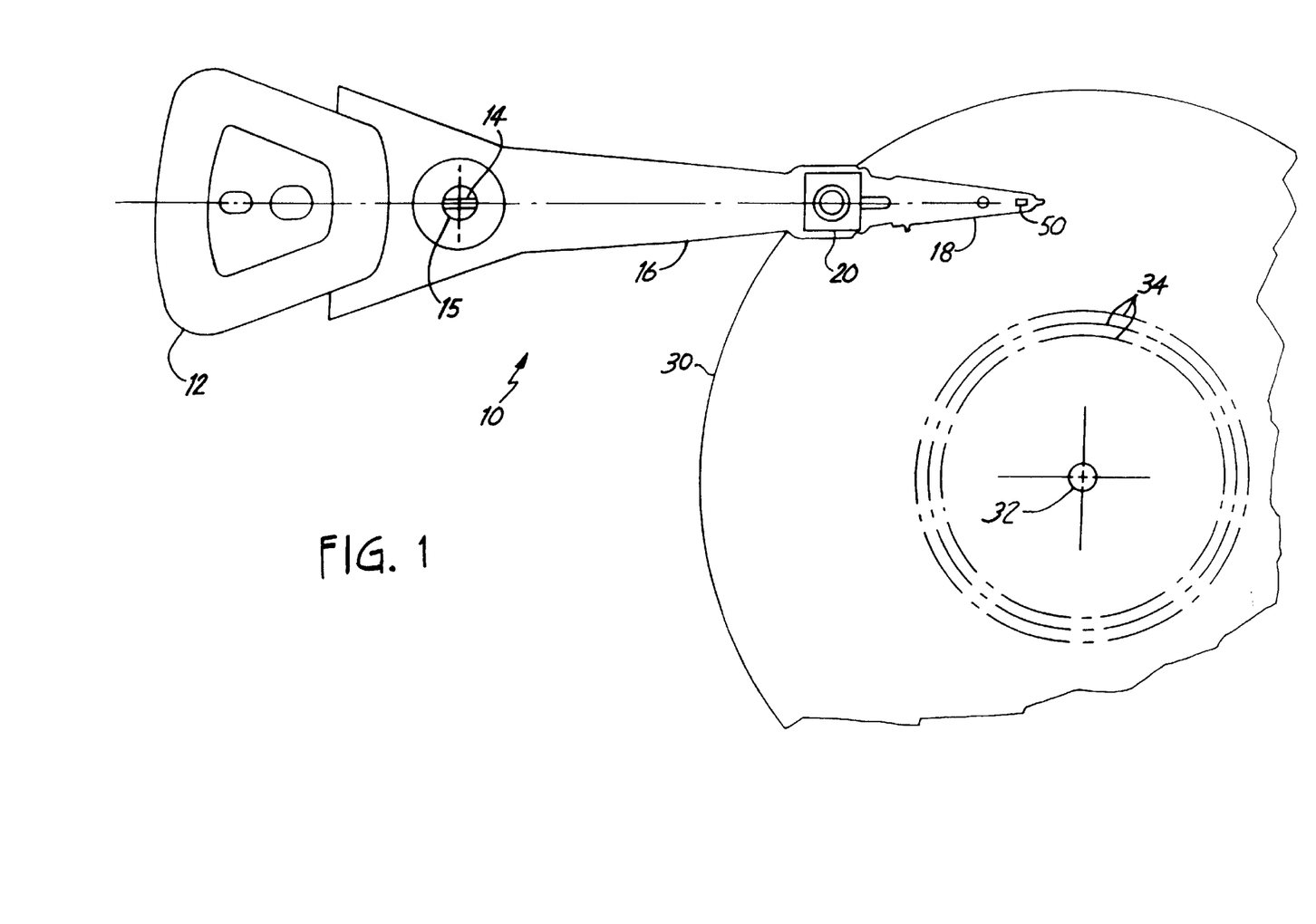
FIG. 1 is a plan view of a dual-stage disc drive actuation system for positioning a slider over tracks of a disc.

FIG. 1 is a plan view of a dual-stage disc drive actuation system 10 for positioning a head-carrying slider over a track 34 of disc 30. Dual-stage actuation system 10 includes voice coil motor (VCM) 12 arranged to rotate actuator arm 16 around axis 14 on spindle 15. Head suspension/load beam 18 is connected to actuator arm 16 at head mounting block 20. Microactuator 50 is attached to load beam 18 and carries the slider, which in turn carries a transducing head for reading and/or writing data on concentric tracks of disc 30. Disc 30 rotates around axis 32, so that windage is encountered by the slider to keep it aloft a small distance above the surface of disc 30.

VCM 12 is selectively operated to move actuator arm 16 around axis 14, thereby moving the transducing head carried by the slider between tracks 34 of disc 30. However, for disc drive systems with high track density, VCM 12 lacks sufficient resolution and frequency response to position the transducing head on the slider precisely over a selected track 34 of disc 30. Therefore, a higher resolution actuation device realized by microactuator 50 is necessary.

Figure 2:
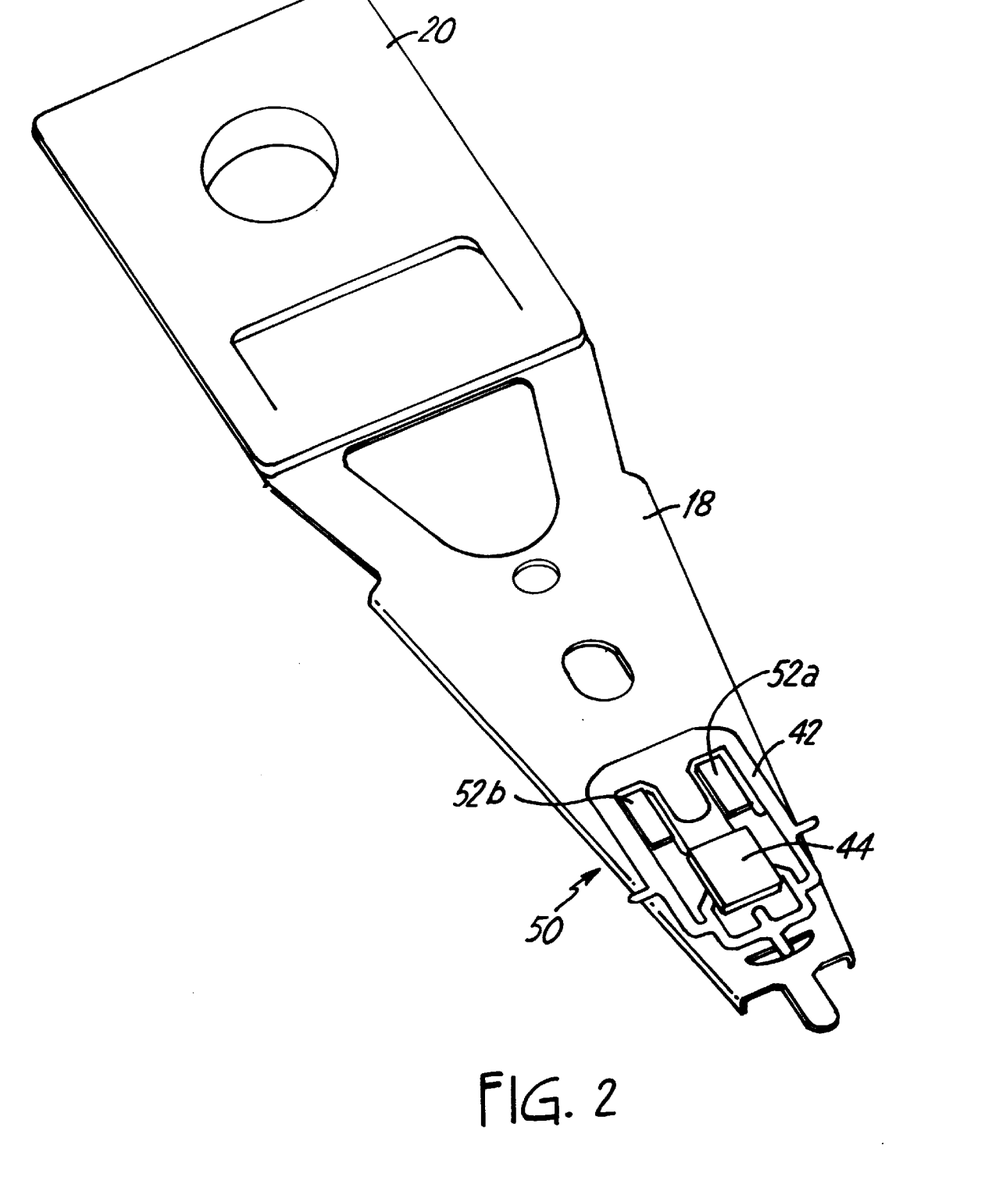
FIG. 2 is a bottom perspective view of a disc drive load beam incorporating an integral microactuator according to the present invention.
Figure 3:
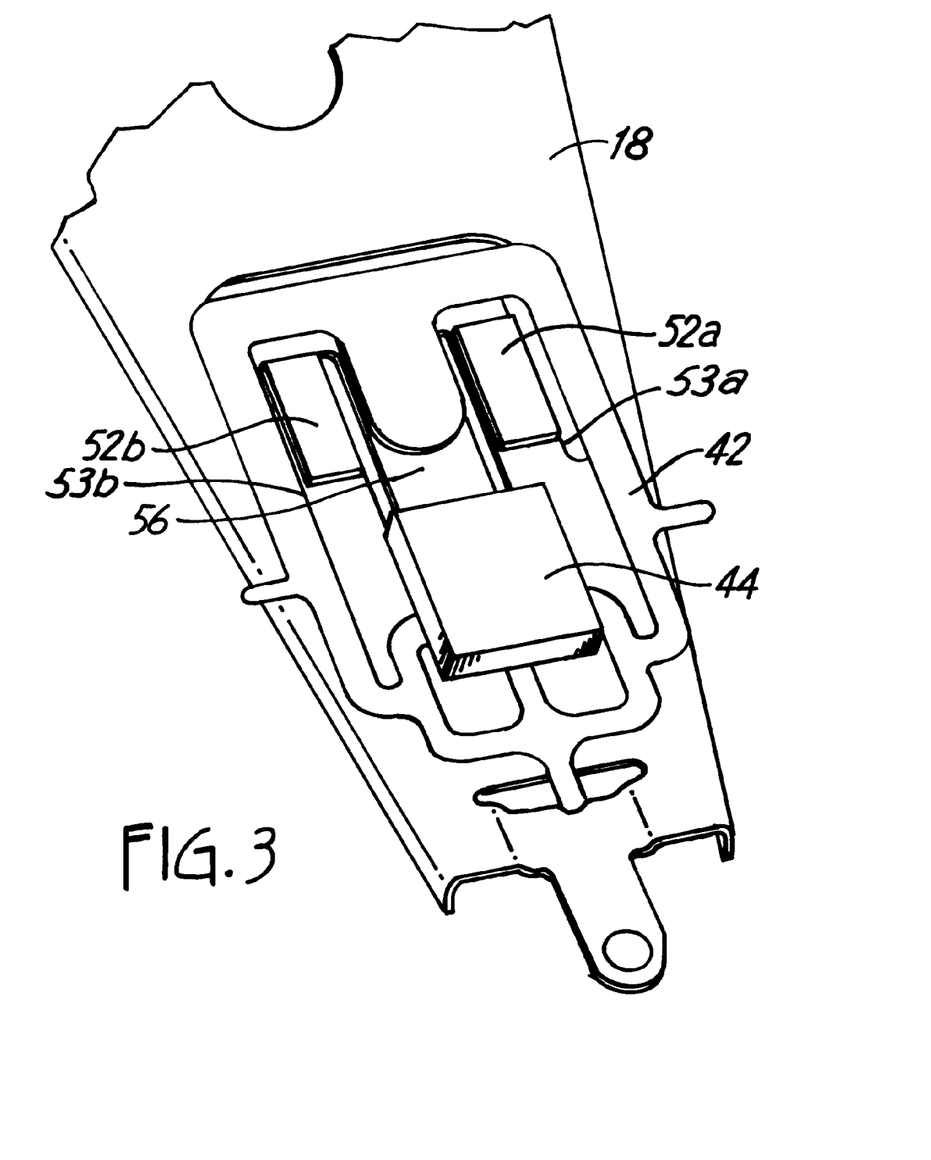
FIG. 3 is an enlarged bottom perspective view of the integral microactuator of the present invention.

FIG. 2 is a bottom perspective view, and FIG. 3 is an enlarged perspective view, of disc drive load beam 18 incorporating integral microactuator 50 according to the present invention. Microactuator 50 is formed integrally with load beam 18 and accordingly has features formed from the same material as load beam 18, typically stainless steel. Microactuator 50 includes etched outer panels 53a and 53b on which piezoelectric elements 52a and 52b are attached, respectively, on the bottom side (facing the rotating disc) thereof. Piezoelectric elements are also attached on the top side (opposite from the rotating disc) of outer panels 53a and 53b; this is discussed below with respect to FIG. 4. Each of outer panels 53a and 53b is thus effectively sandwiched between two piezoelectric crystal elements. Gimbaling flexure 42 is attached to center panel 56 of microactuator 50, and supports slider 44 over a surface of the disc. Operation of microactuator 50 deforms the outer panels and moves flexure 42 and slider 44 as a rigid body, to position a transducing head carried by slider 44 with high resolution over a selected track of the disc.

Figure 4:
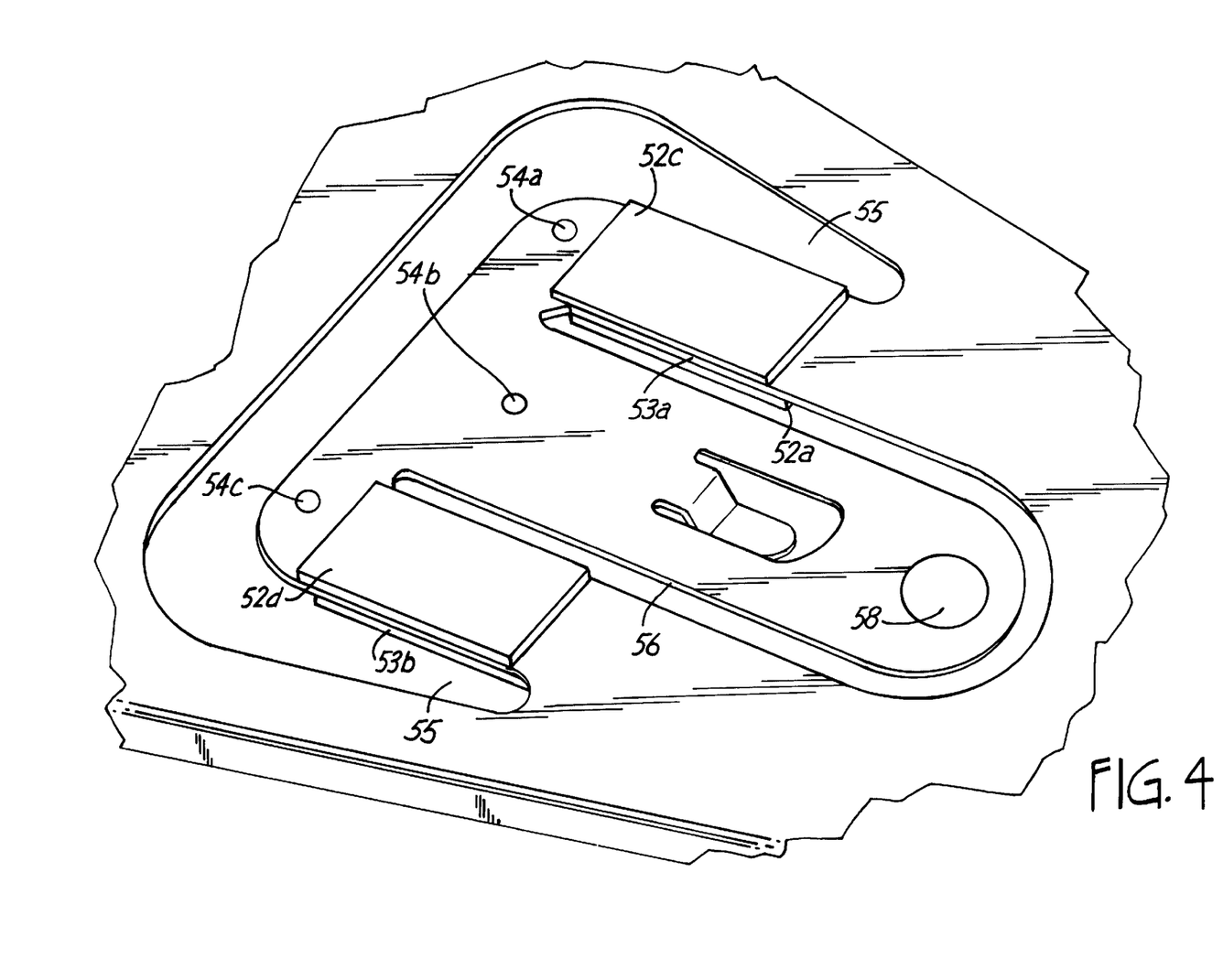
FIG. 4 is an enlarged top perspective view of the integral microactuator of the present invention.

FIG. 4 is an enlarged top perspective view of integral microactuator 50 of the present invention. Outer panels 53a and 53b are formed in load beam 18 in aperture 55 provided therein. Outer panel 53a of microactuator 50 is sandwiched between piezoelectric element 52c on the top side of panel 53a and piezoelectric element 52a on the bottom side of panel 53a. Similarly, outer panel 53b of microactuator 50 is sandwiched between piezoelectric element 52d on the top side of panel 53b and piezoelectric element 52b on the bottom side of panel 53b. Panels 53a and 53b serve to mechanically reinforce piezoelectric crystal elements 52a, 52b, 52c and 52d to provide protection against brittle failure of the piezoelectric elements. Center panel 56 extends between outer panels 53a and 53b, and includes pre-load button 58 to apply pre-load force to flexure 42 carrying slider 24 (see FIG. 3). Attachment joints 54a, 54b and 54c denote the points where flexure 42 (FIG. 3) is attached to microactuator 50 on the bottom surface thereof, facing the rotating disc. Attachment may be achieved by welding, for example, or a similar attachment process known in the art.

In operation, control signals are applied to piezoelectric elements 52a, 52b, 52c and 52d to cause selective expansion or contraction along the lengths of the elements. More specifically, a first control signal is applied to cause expansion or contraction of piezoelectric elements; 52a and 52c, and a second control signal of opposite polarity is applied to cause opposite contraction or expansion of piezoelectric elements 52b and 52d. As a result, outer panels 53a and 53b are forced to bend, which causes lateral displacement of center panel 56 and flexure 42 (FIG. 3) attached thereto. Since outer panels 53a and 53b and center panel 56 are features formed in load beam 18 itself, piezoelectric elements 52a, 52b, 52c and 52d are essentially operable to deflect a portion of load beam 18 to finely position flexure 42 and slider 44 (FIG. 3) adjacent to a selected track of a rotatable disc. Piezoelectric elements 52a and 52c therefore form a first drive system that is operable to cause selective stretching or contraction of first outer panel 53a, and piezoelectric elements 52b and 52d likewise form a second drive system that is operable to cause complementary contraction or stretching of second outer panel 53b. Piezoelectric elements 52a, 52b, 52c and 52d are preferably equally sized and symmetrically arranged to prevent undesired twisting of the microactuator during operation thereof. It should be understood that the first and second drive systems are described herein with respect to a preferred embodiment, and may be realized with a modified driving technology to achieve the desirable microactuator operation of the present invention. The operation of the microactuator is illustrated in greater detail in FIG. 6.

Figure 5:
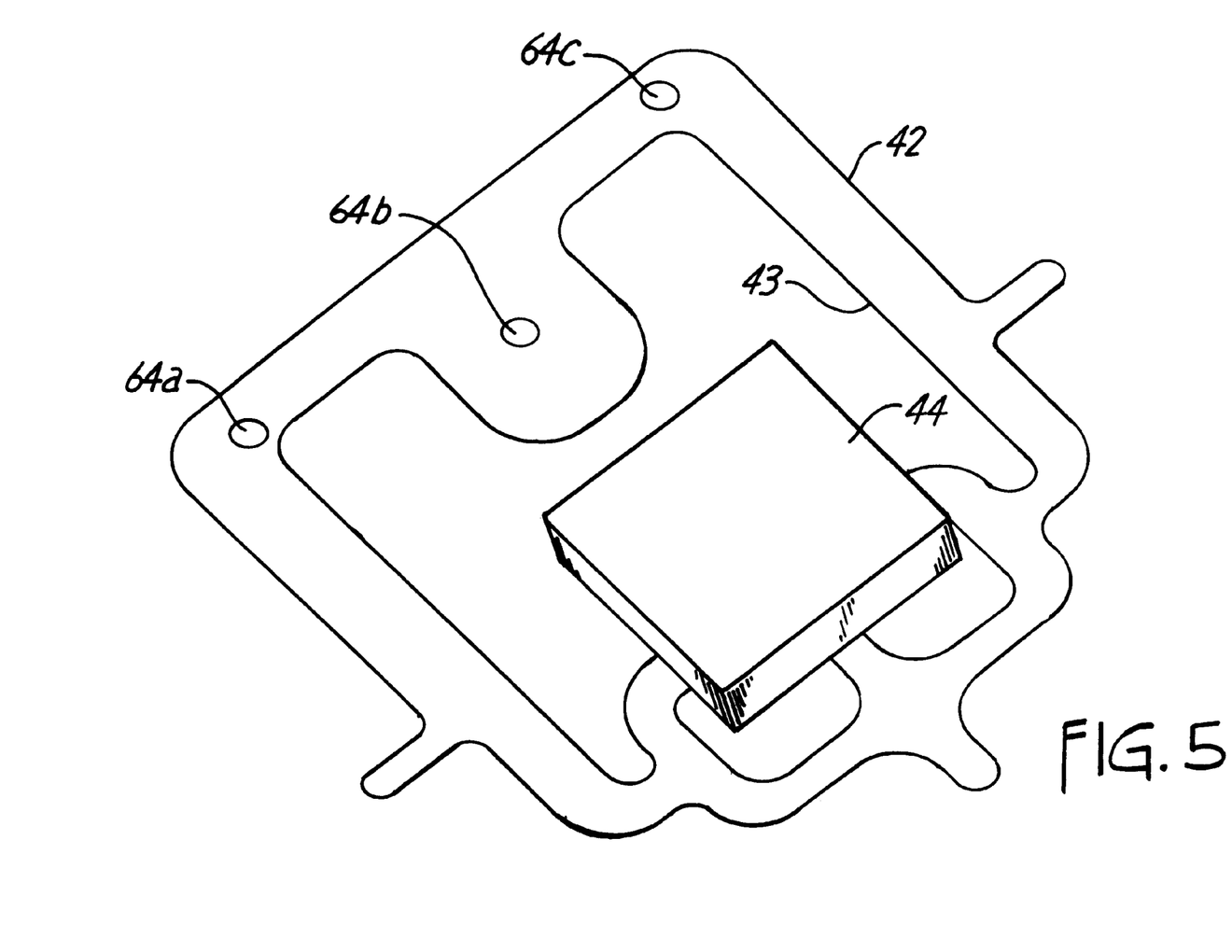
FIG. 5 is an enlarged bottom perspective view of the flexure and slider for use with the integral microactuator of the present invention.

FIG. 5 is an enlarged bottom perspective view of flexure 42 and slider 44 for use with integral microactuator 50 of the present invention. Flexure 42 is typically formed of stainless steel and slider 44 is typically composed of silicon, and material choices for these components are within the expertise of those skilled in the art. Flexure 42 includes aperture 43 and a cross-beam extending therein for attachment to slider 44, to support slider 44 over the surface of the rotating disc. Flexure 42 provides sufficient flexibility to enable slider 44 to follow the contours of the rotating disc as slider 44 flies over the disc in a manner known in the art. Attachment joints 64a, 64b and 64c correspond to attachment joints 54a, 54b and 54c of microactuator 50 (FIG. 4), denoting the points where flexure 42 is attached to microactuator 50.

Figure 6:
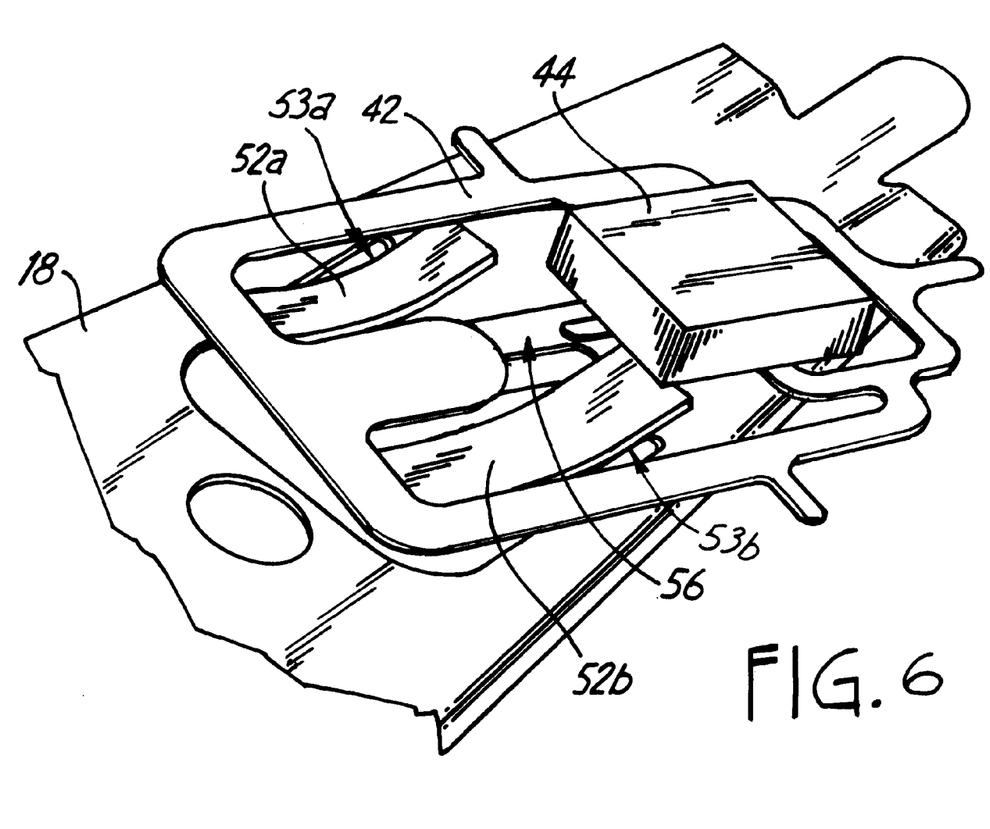
FIG. 6 is a bottom perspective view of the integral microactuator of the present invention in an actuated position.

FIG. 6 is a bottom perspective view of integral microactuator 50 of the present invention in an actuated position, illustrating the operation of microactuator 50 to position slider 24 with high resolution over a selected track of a rotating disc. In response to a high resolution seek operation or a track following command, a voltage is applied to piezoelectric elements 52a and 52c and an opposite voltage is applied to piezoelectric elements 52b and 52d. As a result, piezoelectric elements 52a and 52c experience selective longitudinal expansion or contraction (depending on the polarity of the voltage applied) and piezoelectric elements 52b and 52d experience selective opposite longitudinal expansion or contraction. As a result, outer panels 53a and 53b sandwiched between piezoelectric elements 52a, 52c and 52b, 52d, respectively, undergo complementary lateral bending as shown in FIG. 6. The complementary bending of outer panels 53a and 53b results in rigid body displacement of conter panel 56 as shown, and flexure 42 with slider 44 supported thereby accordingly moves as a rigid body as shown in FIG. 6. Reversing the polarity of the voltages applied to piezoelectric elements 52a, 52b, 52c and 52d results in opposite complementary bending of outer panels 53a and 53b and opposite movement of center panel 56, flexure 42 and slider 44. Microactuator 50 is therefore able to position a transducing head carried by slider 44 with high resolution over a selected track of the rotating disc.

Piezoelectric elements 52a, 52b, 52c and 52d are preferably composed of fine-grain, high-density (FG/HD) piezoelectric material, due to the desirable machinability, electromechanical coupling, and mechanical properties of such materials. The depoling field for these materials is about 10 kilo-Volts per centimeter (kV/cm). With piezoelectric elements 52a, 52b, 52c and 52d formed with a thickness of 0.002 inches, 40 Volts applied across the elements results in a field strength of 7.874 kV/cm, providing a sufficient safety margin to ensure that the elements do not experience depoling during operation of microactuator 50. Piezoelectric elements 52a, 52b, 52c and 52d are attached to outer panels 53a and 53b with an epoxyor similar adhesive. If the mechanical coupling efficiency of the epoxy adhesive is 60%, a 40 Volt input is able to displace a transducing head carried by slider 44 across the tracks of the disc by about 25 micro-inches. Further optimization of the design, specifically of the epoxy adhesive efficiency, can be performed to achieve a microactuator stroke of up to about 40 micro-inches. Microactuator modes of movement occur with a frequency of 17 kilo-Hertz (kHz) and greater, which are distinct from the modes of movement achieved by the main actuator, which typically occur at about 12 kHz.

The design of microactuator 50 has a number of novel and desirable characteristics. By integrating the functions of the microactuator cradle into load beam 18 itself, manufacturing complexity and cost are reduced and material requirements are decreased. Piezoelectric elements 52a, 52b, 52c and 52d are mounted on outer panels 53a and 53b in such a manner that the center of mass of microactuator 50 is located in the same plane as load beam 18. This configuration prevents generation of undesired torque on microactuator 50 when the system is subjected to a lateral shock force in the plane of load beam 18, which is a potential problem for designs where the microactuator extends out of the generally horizontal plane of the load beam. In other words, lateral motion of flexure 42 and slider 44 is de-coupled from torsional motion of load beam 18. Also, due to the symmetrical location of piezoelectric elements 52a, 52b, 52c and 52d and the co-planar deployment of the elements with respect to load beam 18, bending and torsional modes of movement of microactuator 50 are suppressed when the microactuator is operated, meaning that expansion and contraction of piezoelectric elements 52a, 52b, 52c and 52d serves to cause only desired lateral movement of microactuator 50. The present invention is therefore an effective mechanism for positioning a transducing head carried by slider 44, with desirable kinematic and dynamic performance properties.

Although the present invention has been described with reference to preferred embodiments, workers skilled in the art will recognize that changes may be made in form and detail without departing from the spirit and scope of the invention.

What is claimed is:

1. A disc drive having an actuator arm, a load beam connected to the actuator arm, and a flexure connected to the load beam supporting a slider carrying a transducing head adjacent to a rotatable disc having a plurality of concentric tracks, the disc drive comprising:

an actuator for coarsely positioning the actuator arm, load beam, flexure and slider carrying the transducing head adjacent to a selected track of the rotatable disc; and means for deflecting a portion of the load beam which is attached to the flexure to finely position the flexure and the slider carrying the transducing head adjacent to the selected track of the rotatable disc.

2. A disc drive comprising:

a rotatable disc having a plurality of concentric tracks on a surface thereof;

an actuator arm;

a load beam attached to the actuator arm;

a flexure attached to a deflectable portion of the load beam;

a slider supported by the flexure proximate the surface of the rotatable disc, the slider carrying a transducing head for transducting data with the disc;

an actuator for coarsely positioning the actuator arm, load beam, flexure and slider carrying the transducing head adjacent to a selected track of the rotatable disc; and a microactuator integrally formed in the load beam, the microactuator being operable to deflect the deflectable portion of the load beam to finely position the flexure and the slider carrying the transducing head adjacent to the selected track of the rotatable disc.

3. The disc drive of claim 2, wherein the microactuator comprises:

a first outer panel generally coplanar with the load beam;

a second outer panel generally coplanar with the load beam;

a first pair of piezoelectric elements attached to opposite sides of the first outer panel;

a second pair of piezoelectric elements attached to opposite sides of the second outer panel; and a center panel attached between the first outer panel and the second outer panel, the center panel being attached to the flexure.

4. The disc drive of claim 3, wherein the microactuator is responsive to a first voltage applied to the first pair of piezoelectric elements and a second voltage applied to the second pair of piezoelectric elements to cause complementary bending of the first and second outer panels to displace the center panel attached to the flexure supporting the slider carrying the transducing head.

5. The disc drive of claim 4, wherein the first voltage has a polarity opposite to a polarity of the second voltage.

6. The disc drive of claim 4, wherein application of the first and second voltages with a level of 40 Volts enables a stroke of the microactuator up to about 40 micro-inches.

7. The disc drive of claim 4, wherein application of the first and second voltages with a level of 40 Volts enables a stroke of the microactuator up to about 25 micro-inches where an efficiency of attachment between the piezoelectric elements and the first and second outer panels of the microactuator is about 60%.

8. A microactuator assembly integrated into a load beam of a disc drive, the disc drive having an actuator arm supporting the load beam, a flexure attached to the load beam and a head-carrying slider supported by the flexure adjacent to a surface of a rotatable disc, the microactuator assembly comprising:

first and second outer panels formed in the load beam, the first and second outer panels extending generally parallel to a length of the load beam in an aperture of the load beam;

a center panel attached between the first and second outer panels, the center panel being attached to the flexure supporting the head-carrying slider adjacent to the surface of the rotating disc;

a first drive system attached to the first outer panel, the first drive system being responsive to a first control signal to bend the first outer panel; and a second drive system attached to the second outer panel, the second drive system being responsive to a second control signal to bend the second outer panel complementary to the first outer panel and thereby displace the center panel to finely position the flexure supporting the head-carrying slider relative to a selected track of the rotating disc.

9. The microactuator assembly of claim 8, wherein the first drive system comprises a first pair of piezoelectric elements attached to opposite surfaces of the first outer panel and the second drive systeri comprises a second pair of piezoelectric elements attached to opposite surfaces of the second outer panel.

10. The microactuator assembly of claim 9, wherein the first control signal is a first voltage and the second control signal is a second voltage having a polarity opposite to a polarity of the first voltage.

11. The microactuator assembly of claim 10, wherein application of the first and second voltages with a level of 40 Volts enables a stroke of the microactuator up to about 40 micro-inches.

12. The microactuator assembly of claim 10, wherein application of the first and second voltages with a level of 40 Volts enables a stroke of the microactuator up to about 25 micro-inches where an efficiency of attachment between the piezoelectric elements and the first and second outer panels of the microactuator is about 60%.

13. The microactuator assembly of claim 8, wherein the first and second outer panels are generally coplanar with the load beam.

* * * * *

UNITED STATES PATENT AND TRADEMARK OFFICE
CERTIFICATE OF CORRECTION

PATENT NO. : 6,297,936 B1
DATED : October 2, 2001
INVENTOR(S) : Rishi Kant et al.

It is certified that error appears in the above-identified patent and that said Letters Patent is hereby corrected as shown below:

Column 1,
Line 22, delete "mctor,", insert -- motor --
Line 23, delete "largc-scalc", insert -- large-scale --

Column 2,
Line 2, delete "tc", insert -- to --
Line 11, delete "ofthe", insert -- of the --.

Column 3,
Line 13, delete "elements;", insert -- elements --
Line 37, delete "ofthe", insert -- of the --

Column 4,
Line 1, delete "respecti vely", insert -- respectively --
Line 4, delete "conter", insert -- center --
Line 25, delete "epoxyor", insert -- epoxy or --

Column 5,
Line 20, delete "transducting", insert -- transducing --

Column 6,
Line 34, delete "systeri", insert -- system --

Signed and Sealed this

Eleventh Day of June, 2002

Attest:

JAMES E. ROGAN
Attesting Officer        Director of the United States Patent and Trademark Office